United States Patent [19]

Takada

[11] Patent Number: 4,878,218
[45] Date of Patent: Oct. 31, 1989

[54] DATA TRANSMISSION METHOD AND DATA TRANSMISSION SYSTEM FREE FROM LOCAL TRAFFIC JAM

[75] Inventor: Ikuko Takada, Tokyo, Japan

[73] Assignee: Kabushiki Kaisha Toshiba, Kawasaki, Japan

[21] Appl. No.: 235,553

[22] Filed: Aug. 24, 1988

[30] Foreign Application Priority Data

Aug. 31, 1987 [JP] Japan .................................. 62-216659
Jun. 10, 1988 [JP] Japan .................................. 63-142909

[51] Int. Cl.$^4$ .............................................. H04J 3/26
[52] U.S. Cl. .................................................... 370/94
[58] Field of Search ........................ 370/94, 95, 85, 89, 370/60; 340/825.52, 825.51, 825.5, 825.03

[56] References Cited

U.S. PATENT DOCUMENTS

| | | | |
|---|---|---|---|
| 4,078,228 | 3/1978 | Miyazaki | 370/86 |
| 4,536,877 | 8/1985 | Livingston et al. | 370/94 |
| 4,638,477 | 1/1987 | Okada et al. | 370/94 |
| 4,663,758 | 5/1987 | Lambarelli et al. | 370/94 |
| 4,697,263 | 9/1987 | Beaufoy | 370/104 |
| 4,727,537 | 2/1988 | Nichols | 370/94 |

*Primary Examiner*—Douglas W. Olms
*Attorney, Agent, or Firm*—Oblon, Spivak, McClelland, Maier & Neustadt

[57] ABSTRACT

A data transmission system capable of eliminating a local traffic jam comprises a plurality of packet controllers each including a queue buffer for storing packets, the packet controllers being arranged in one-to-one correspondence with channels of a multiplexed transmission line, and an adapter for transmitting an object packet to a packet controller selected in accordance with a priority included in the object packet and an average priority of the packets stored in each queue buffer. Each packet controller receives the object packet from the adapter, stores the received packet, reads out the stored packets from the queue buffer, the number of which is determined in accordance with transition of a degree of traffic jam of the corresponding channel, and transmits the readout packets to other stations through the corresponding channel. Each packet controller calculates an average priority of the packets stored in the queue buffer. The adapter transmits the object packet to the packet controller having the average priority lower than the priority of the object packet.

20 Claims, 7 Drawing Sheets

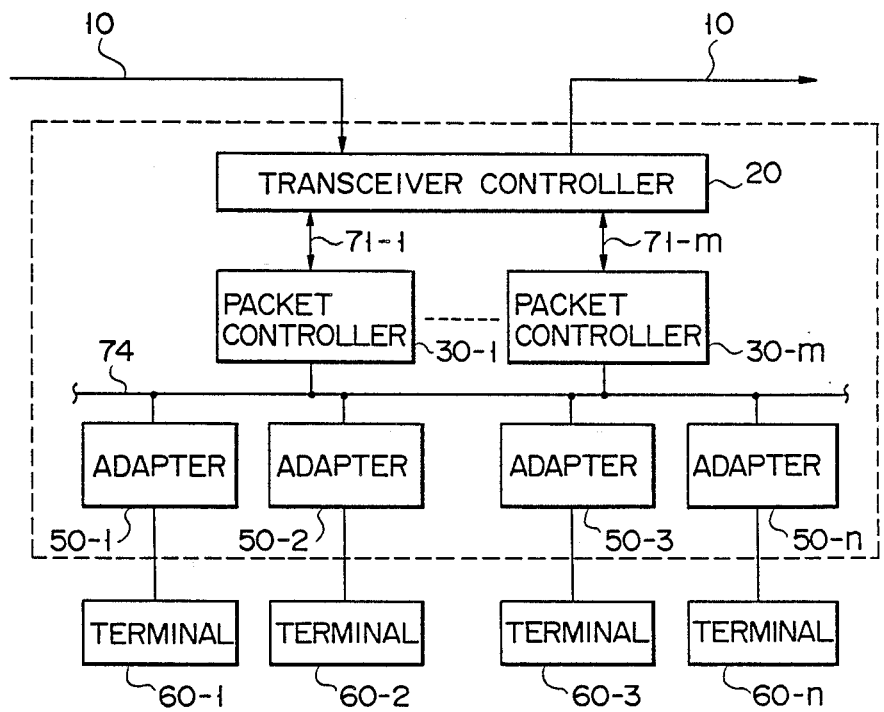
F I G. 2

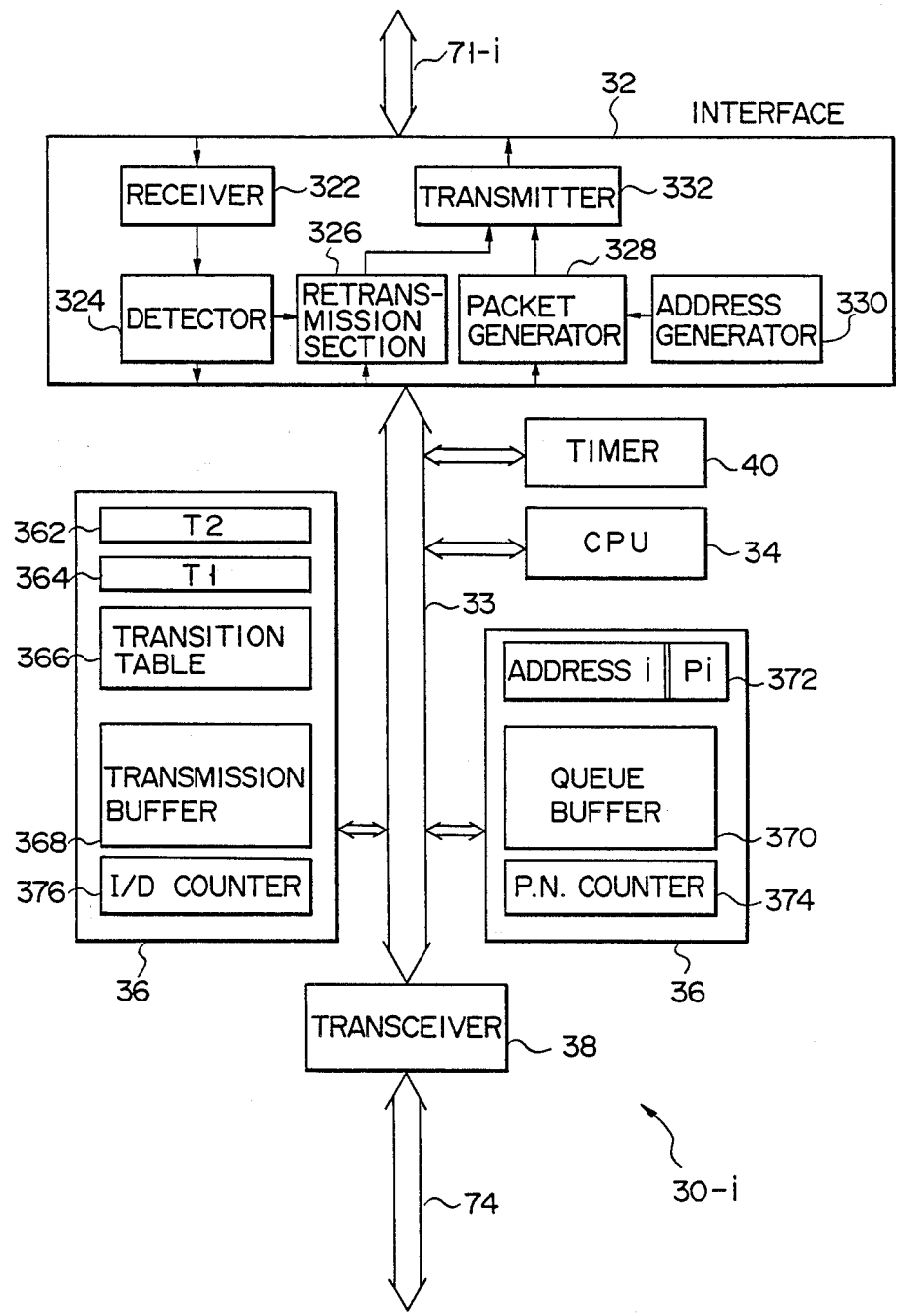
F I G. 5

| T1 | T2-T1 | M | ΔI1 | ΔI2 |
|---|---|---|---|---|
| t1 | Δt1 | M1 | $n_{11}$ | $n_{21}$ |
| t1 | Δt1 | M2 | $n_{12}$ | $n_{22}$ |
| ⋮ | ⋮ | ⋮ | ⋮ | |
| t1 | Δtℓ | M2 | $n_{1q'}$ | $n_{2q'}$ |
| t2 | Δt1 | M1 | $n_{1q'+1}$ | $n_{2q'+1}$ |
| ⋮ | ⋮ | ⋮ | | |
| tℓ | Δtℓ | M2 | $n_{1q}$ | $n_{2q}$ |

DATA TRANSMISSION METHOD AND DATA TRANSMISSION SYSTEM FREE FROM LOCAL TRAFFIC JAM

BACKGROUND OF THE INVENTION

1. Field of the Invention

The present invention relates to a data transmission method and a data transmission system using a packet and, more particularly, to a data transmission system free from the problem of local traffic jams.

2. Description of the Related Art

FIG. 1 shows an example of a conventional arrangement of a data transmission system using a packet. The system shown in FIG. 1 comprises loop transmission line 100, station 102, and terminals 104-1 and 104-2. Transmission line 100 is multiplexed, and station 102 comprises packet controllers 114-1 and 114-2 to which are connected adapters 116-1 and 116-2, respectively. Terminals 104-1 and 104-2, in turn, are respectively connected to adapters 116-1 and 116-2.

The operation of the conventional data transmission system will now be described below.

When the system is in a data transmission mode, data output from terminal 104-1 or 104-2 is supplied to specific packet controller 114-1 or 114-2, through adapter 116-1 or 116-2. The recipient controller then generates a packet, using the input data, and sends the packet out to transceiver controller 112. Controller 112 detects an assigned band specific to the controller which has sent out the packet, multiplexes the packet in the corresponding band, and transmits it onto transmission line 100.

When the system is in a data reception mode, data on transmission line 100 is received by transceiver controller 112 and sent to one of the packet controllers, in accordance with the band assigned to the received data. When the controller in question detects that the packet it has received from controller 112 is sent to the intrastation, the packet is sent to either terminal 104-1 or 104-2, through adapter 116-1 or 116-2, respectively.

In the above data transmission system, transmission bands or channels are individually assigned to a large number of terminals coupled to a loop transmission line. In this system, even if only one loop transmission line is physically used, it appears as different transmission channels the terminals. Therefore, since the specific channels are assigned to the terminals, respectively, communication between the terminals connected to packet controllers using different channels is not allowed.

Even if a local traffic jam occurs in a specific packet controller in the station, this cannot be eliminated (the load cannot be redistributed). In addition, the processing speed of the packet controller must be matched with the transmission speed of the loop transmission line, thus presenting problems in terms of transmission efficiency, transmission speed, and the like.

SUMMARY OF THE INVENTION

The present invention has been developed in consideration of the above situation, and has as its object to provide a data transmission system which is free from the problem of local traffic jams. The system according to the present invention comprises: a plurality of packet controllers the number of which is equal to the number of channels of a multiplexed transmission line, each packet controller being provided with a queue buffer for storing packets; and an adapter for transmitting an object packet to a selected packet controller determined in accordance with a priority included in the object packet and priorities of packets stored in queue buffers. Each packet controller receives the object packet from the adapter and stores the received packet in the corresponding queue buffer. Each packet controller reads out from the corresponding queue buffer packets, the number of which is determined by a degree of transition of traffic jam of the corresponding channel. The readout packets are sent to other stations through the corresponding channel.

Each packet controller calculates an average priority of the packets stored in the corresponding queue buffer. The adapter sends the object packet to the packet controller having a selected queue buffer having an average priority lower than that of the object packet.

The packet controller detects a degree of traffic jam on a transmission line and transition of the traffic jam in accordance with a first time representing a cyclic time of transmission enable data in the second previous cycle and a second time representing a cyclic time of transmission enable data in the immediately preceding cycle and determines the number of transmittable packets, with reference to a transition table representing the relationship between transition of the degree of traffic jam and the number of packets.

According to the data transmission system of the present invention, a packet band of each terminal is not specified, and communication between any terminals is allowed. In addition, an average traffic state is assigned to each band, and local contention of queues in a plurality of packet controllers in each station can be eliminated. Therefore, waiting time for each packet can be reduced, and packet transmission can be effectively performed. In addition, processing can be performed by simple software, and the load of the adapter can be reduced. In order to transmit the data at the same transmission speed as the conventional one, a packet controller having a lower speed can be used.

BRIEF DESCRIPTION OF THE DRAWINGS

FIG. 2 is a block diagram of a station used in a data transmission system according to an embodiment of the present invention;

FIG. 5 is a block diagram showing a detailed arrangement of a packet controller shown in FIG. 1;

DETAILED DESCRIPTION OF THE PREFERRED EMBODIMENTS

A data transmission system according to an embodiment of the present invention will now be described, with reference to the accompanying drawings.

Figure 1:
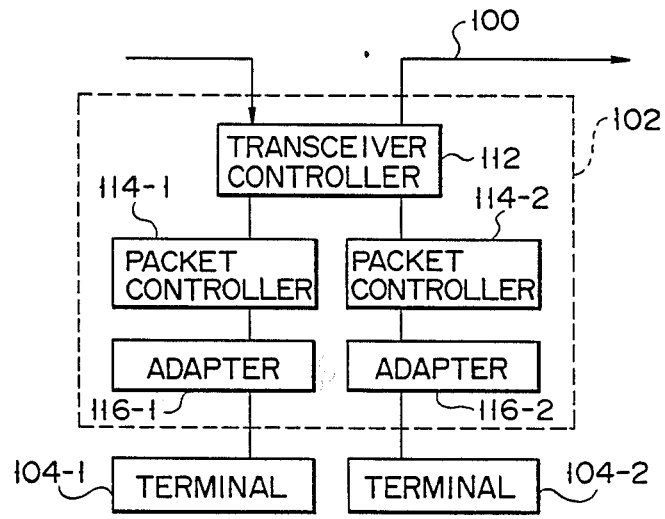
FIG. 1 is a block diagram showing an arrangement of a station in a conventional loop transmission system.
Figures 3, 4:
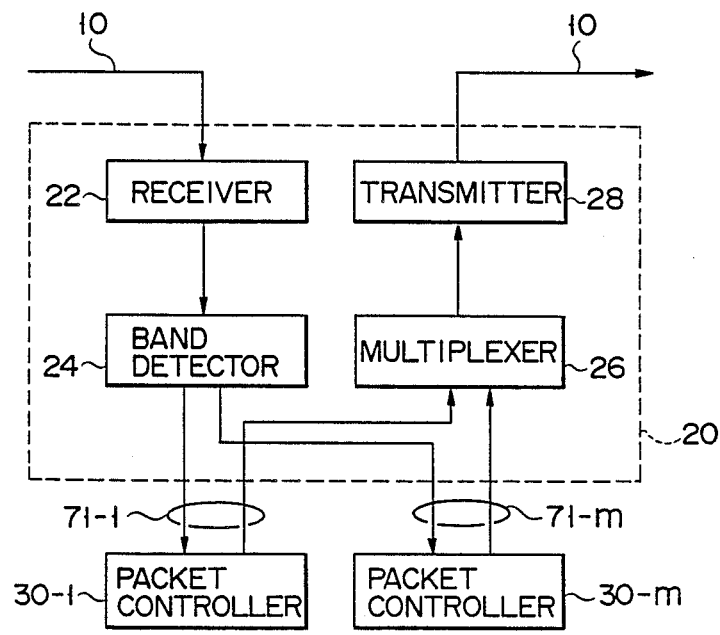
FIG. 3 is a block diagram showing a network employing the data transmission system of the present invention.
FIG. 4 is a block diagram showing a detailed arrangement of a transceiver controller shown in FIG. 1.

FIG. 3 shows a network employing the data transmission system according to the present invention. Stations 1S, 2S, ... nS are connected to loop transmission line 10, and data transmission is performed between the stations, by means of multiplexing communication.

Referring to FIG. 2, an arrangement of each station used in the data transmission system according to the present invention will now be described.

The number of packet controllers in a station is associated with the degree of multiplexing of the transmission line. In this embodiment, the transmission line is obtained by multiplexing m channels. Therefore, each station includes m packet controllers.

In a data reception mode, each station includes transceiver controller 20 for receiving transmission data from transmission line 10 and for sending a packet of the transmission data to packet controller 30-i (i=1 to m) on the basis of a channel, i.e., a transmission band. Alternatively, in a data transmission mode, controller 20 multiplexes packets from packet controllers 30-i to format transmission data and sends the transmission data onto transmission line 10.

In the data reception mode, each controller 30-i receives the packet from controller 20. If, for example, the received packet is supposed to be sent to terminal 60-2, controller 30-i sends it to adapter 50-2, to which terminal 60-2 is connected. Each adapter 50-2 receives the packet from controller 30-i and sends data of the packet to terminal 60-2 connected thereto. In a data transmission mode, each adapter 50-j formats a packet from data from terminal 60-j to send it to specific controller 30-i in accordance with its priority. Controller 30-i sends the packet from adapter 50-j (j=1 to n) to controller 20. In this embodiment, one terminal is connected to one adapter. However, a plurality of terminals may be connected to one adapter.

Detailed arrangements of the respective components will be described below.

First, an arrangement of transceiver controller 20 will be described with reference to FIG. 4.

In controller 20, receiver 22 receives transmission data from transmission line 10 in a data reception mode. The received transmission data is supplied to band detector 24. Detector 24 detects packets in units of bands of the transmission data. The detected packet is transmitted to packet controller 30-i in accordance with the band assigned to the packet. In a data transmission mode, multiplexer 26 multiplexes the packet sent from controller 30-i in accordance with a band assigned to each controller 30-i and generates multiplexed data as the transmission data. The transmission data is transmitted onto transmission line 10 through transmitter 28.

Next, an arrangement of packet controller 30-i will be described with reference to FIG. 5. Each controller 30-i has the identical arrangement. Character i is omitted in the figure.

In the data reception mode, a packet input from transceiver controller 20 through bus 71-i is received by receiver 322 and supplied to detector 324. Detector 324 detects whether the received packet is sent to the intrastation from a destination address of the received packet. If the packet is sent to the intrastation, the received packet is stored in a reception buffer (not shown). If the received packet is detected by detector 324 as control data, i.e., transmission enable data, timer 40 is stopped. Timer 40 is started when the transmission enable data is output to one neighbor station. When timer 40 is stopped, a counted value T1 by timer 40 is stored in register 364 after data T1 which have been stored in register 364 is transferred as data T2 to register 362. If detector 324 detects neither contents of the packet, the packet is transmitted to controller 20 through retransmission section 326 and transmitter 332. When packet transmission is completed, the transmission enable data is output from CPU 34 to retransmission section 326.

In the data transmission mode, the packet is transmitted to packet generator 328. At the same time, address generator 330 generates an intrastation address and a destination station address, and these addresses are also output to generator 328. The station addresses are written in destination and source address fields of the packet and then the packet is processed into a required transmission format. The processed packet is transmitted to controller 20 through transmitter 332.

Receiver 322, detector 324, retransmission section 326, packet generator 328, address generator 330, and transmitter 332 constitute interface 32. Packet controller 30-i further includes timer 40, CPU 34, memory 34, and transceiver 38.

CPU 34 controls the overall operation of packet controller 30-i. Timer 40 measures a cyclic time of the control data or the transmission enable data. Memory 36 includes register 362 and 364, transition table 366, transmission buffer 368, I/D counter 376, register 372, queue buffer 370, and P.N. counter 374. Registers 362 and 364 store times T2 and T1 required for causing the control data to circulate the loop transmission line in the cycles which are two and one cycle ahead of the current cycle. Transition table 366 gives the number N of packets to be transmitted upon detection of the control data, in accordance with a degree/transition of the degree of a local traffic jam on a given channel and the number of/change in the number of transmission packets stored in queue buffer 370. Transmission buffer 368 stores pockets to be transmitted. Queue buffer 370 sequentially stores packets from adapter 50-j. Register 372 stores the average priority of all the packet stored in queue buffer 370. Packet number (P.N.) counter 374 stores the number of packets in buffer 370. Increase/decrease (I/D) counter 376 stores the increased/ decreased number of packets during one circulation of the transmission enable data. A reception buffer (not shown) is also included in memory 36. ADDRESS i is assigned to register 372.

A packet read out from the reception buffer is transmitted to adapter 50-j through transceiver 38 in accordance with a destination terminal address in the packet. A packet from adapter 50-j is stored in queue buffer 370. At the same time, the contents of counter 374 and 376 are updated. Also, the average priority is calculated by CPU 34 and stored in register 372.

Figure 6:
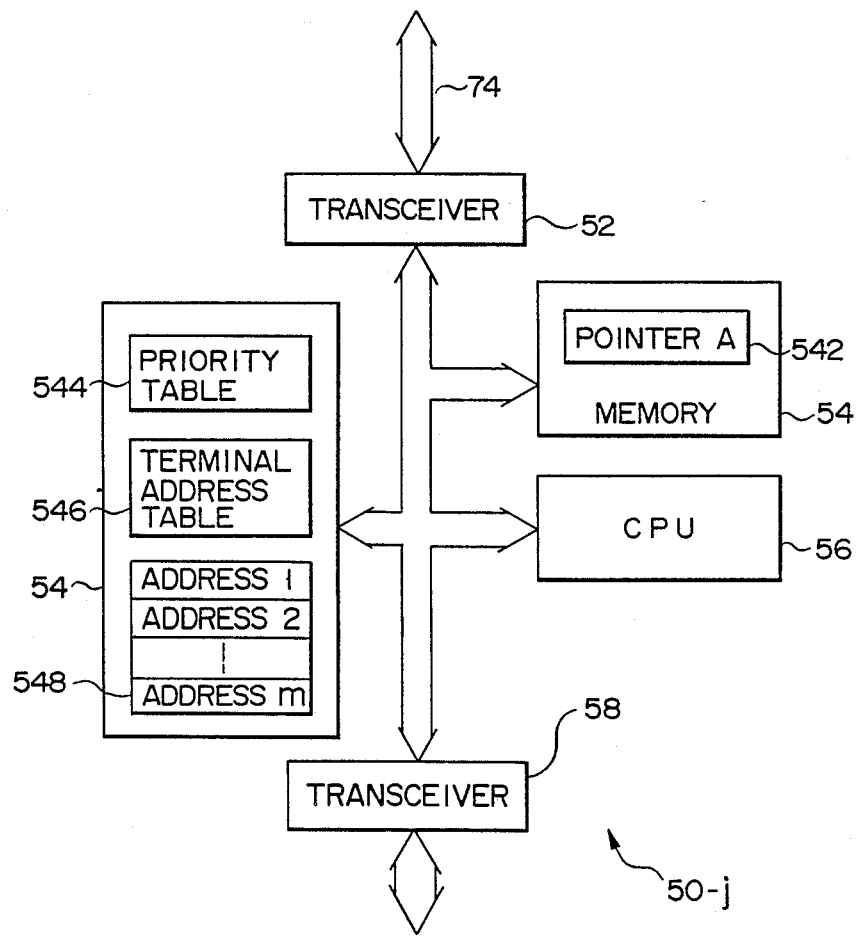
FIG. 6 is a block diagram showing a detailed arrangement of an adapter shown in FIG. 1.

An arrangement of adapter 50-j will be described with reference to FIG. 6. Each adapter 50-j has the identical arrangement and character j is omitted.

Each adapter 50-j comprises transceiver 52, CPU 56, memory 54, and transceiver 58. Memory 54 includes pointer A 542, average priority search table 548, priority table 544, and terminal address table 546. Pointer A 542 designates each element in average priority search table 548. Priority table 544 stores a priority determined according to the type of data from terminal 60-j. Terminal address table 546 stores terminal addresses of a terminal connected to each adapter 50-j and terminals in other stations. Average priority search table 548 stores register addresses used to determine a packet controller for a packet to be transmitted. A reception buffer (not shown) is also included in memory 54.

CPU 56 controls the overall operation of adapter 50-j. When transfer data is input from terminal 60-j, CPU 56 refers to priority table 544 to determine a priority in accordance with the type of the input transfer data. CPU 56 also refers to terminal address table 546 to determine a source terminal address and a destination terminal address. Station addresses may be determined using table 546. The determined destination terminal address, the determined source terminal address, the determined priority, and the input transfer data are used to constitute a packet in a packet format shown in FIG. 7. CPU 56 refers to average priority search table 548 while updating pointer A542, checks average priority for each packet controller 30-i using the register address specified by pointer A, and determines a destination packet controller. The packet is transmitted to the destination packet controller 30-i. Data of the packet from controller 30-i is transmitted to the terminal designated by the destination terminal address.

Figure 8:
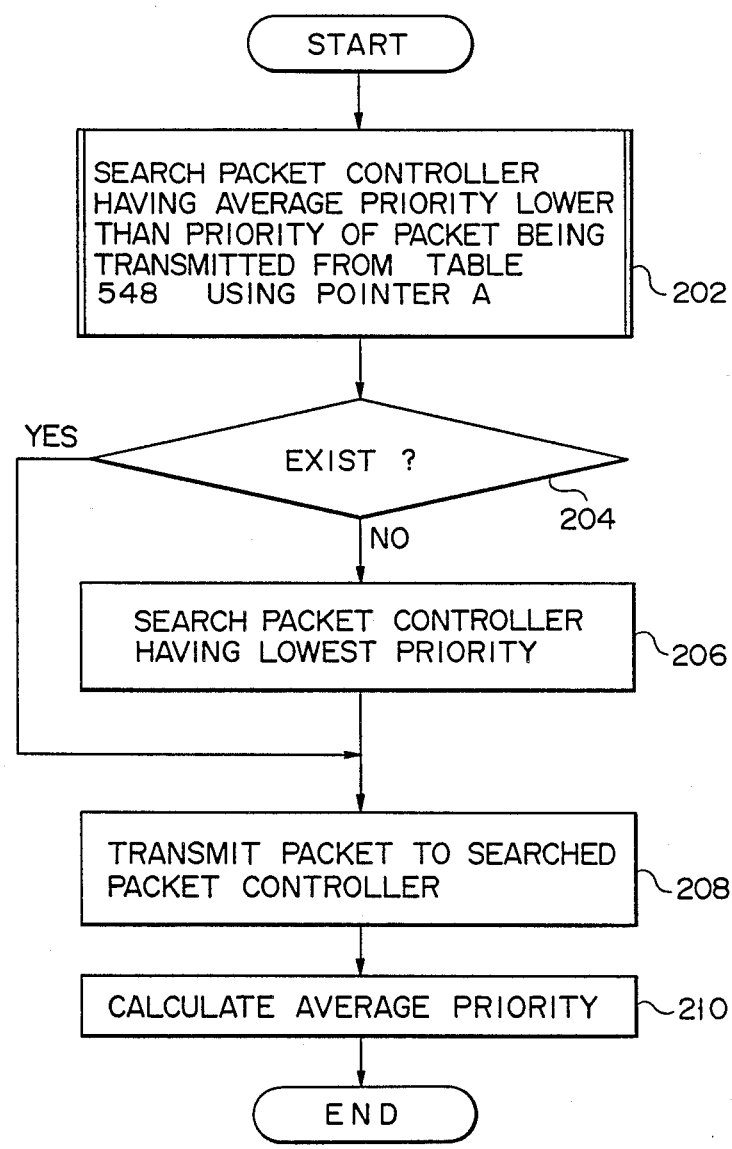
FIG. 8 is a flow chart for explaining the processing performed in order to determine the packet controller to which a packet, is to be transferred.

An operation of the data transmission system according to the present invention will be described with reference to FIGS. 8 and 11.

Assume that transfer data is transmitted from terminal 60-1 to any other station.

Figure 7:
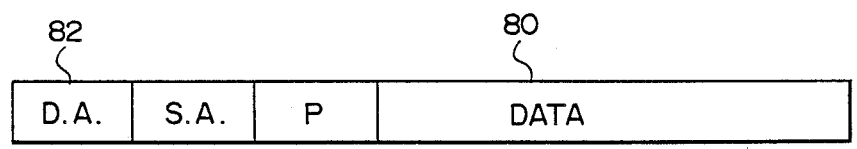
FIG. 7 shows a format of a packet transferred from the adapter to the packet controller.

When the transfer data from terminal 60-1 is received by adapter 50-1, adapter 50-1 refers to table 544 and determines priority P of the transfer data in accordance with the type of the transfer data in step 202. Adapter 50-1 refers to table 546 to determine the source and destination terminal addresses. A packet is formed by the transfer data, the destination terminal address written in D.A. field, the source terminal address written in S.A. field, and priority P written in a priority field, as is shown in FIG. 7. Thereafter, adapter 50-1 refers to average priority search table 548 (FIG. 9) to search a destination packet controller having an average priority lower than priority P of the packet. Since each element in table 548 corresponds to ADDRESS i of average priority register 372-i, the average priority of each packet controller can be checked using the ADDRESS i designated by pointer A 542.

If pointer A 542 currently designates ADDRESS 1, when the transfer data is input from terminal 60-1, pointer A 542 is updated and designates ADDRESS 2 corresponding to packet controller 30-2. Average priority P2 stored at ADDRESS 2 is checked. The average priority is calculated by adding priorities of packets stored in queue buffers 370 and dividing the sum by the number M of packets stored in counter 374. If average priority P2 of ADDRESS 2 is higher than the priority P of the packet, pointer A 542 is updated for ADDRESS 3. In this manner, the average priorities at ADDRESSES i are sequentially checked. When the priorities are checked up to ADDRESS m, the cycle returns to ADDRESS 1. In this manner, a cyclic operation is performed while the average priority is being checked.

If average priority P2 of ADDRESS 2 is lower than priority P of the packet, packet controller 30-2 corresponding to ADDRESS 2 is determined as a destination packet controller. In this case, pointer A is kept unchanged so as to represent ADDRESS 2 until the next search operation is initiated. With this arrangement, the search operation is not always started from ADDRESS 1 and concentration of the packets at controller 30-1 can be prevented. If the transmission frequency is low, pointer A may be reset upon completion of the search operation.

When a packet controller having an average priority lower than priority P of the packet is searched, Y or YES is obtained in step 204. In this case, an operation in step 208 is performed. In step 208, the packet is transmitted to the destination packet controller, i.e., packet controller 30-2 and is stored in queue buffer 370-2. At this time, the contents of counters 374-2 and 376-2 are updated.

If N or NO in step 204, i.e., if no packet controller having an average priority lower than priority P of the packet is detected, an operation in step 206 is performed. In step 206, table 548 is searched while pointer A is being updated, and the average priority register having the lowest average priority, or the packet controller is determined. An operation in step 208 is then performed, and the packet is transmitted to the searched packet controller. In this case, the operations in steps 202 and 206 are separately performed. However, while pointer A 542 is updated, destination packet controller having an average priority lower than the priority of the packet may be searched and an address corresponding to a packet controller having the current lowest average priority may be held.

In step 210, packet controller 30-2 stores the packet in queue buffer 370-2 when receives it from adapter 50-1. Then, packet controller 30-2 calculates the average priority of the packets stored in queue buffer 370-2 using the content of counter 374-2 and stores the calculated average priority in average priority register 372-2.

Data T2 and T1 are respectively stored in registers 362-2 and 364-2. Packet controller 30-2 calculates a difference between data T2 and T1 in step 220 and therefore determines a transition of a degree of channel traffic jam. In step 222, data in transition table 366 are retrieved to check the number N of transmissible packets in accordance with the degree of channel traffic jam, its transition, and the contents of counter 374-2 and 376-2.

Figures 9, 11:
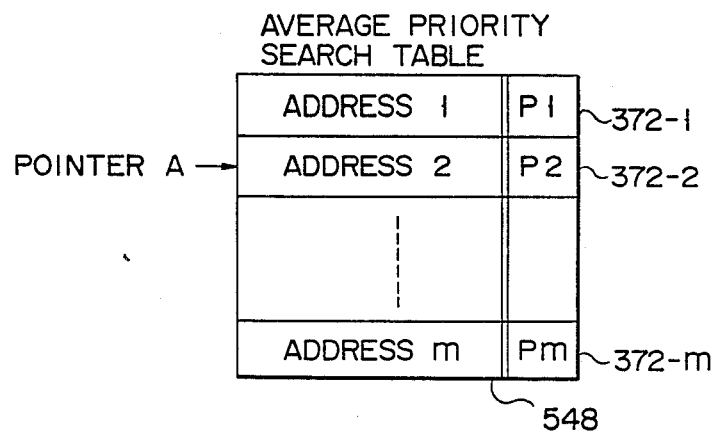
FIG. 9 is an average priority search table.
FIG. 11 is a transition table.
Figure 10:
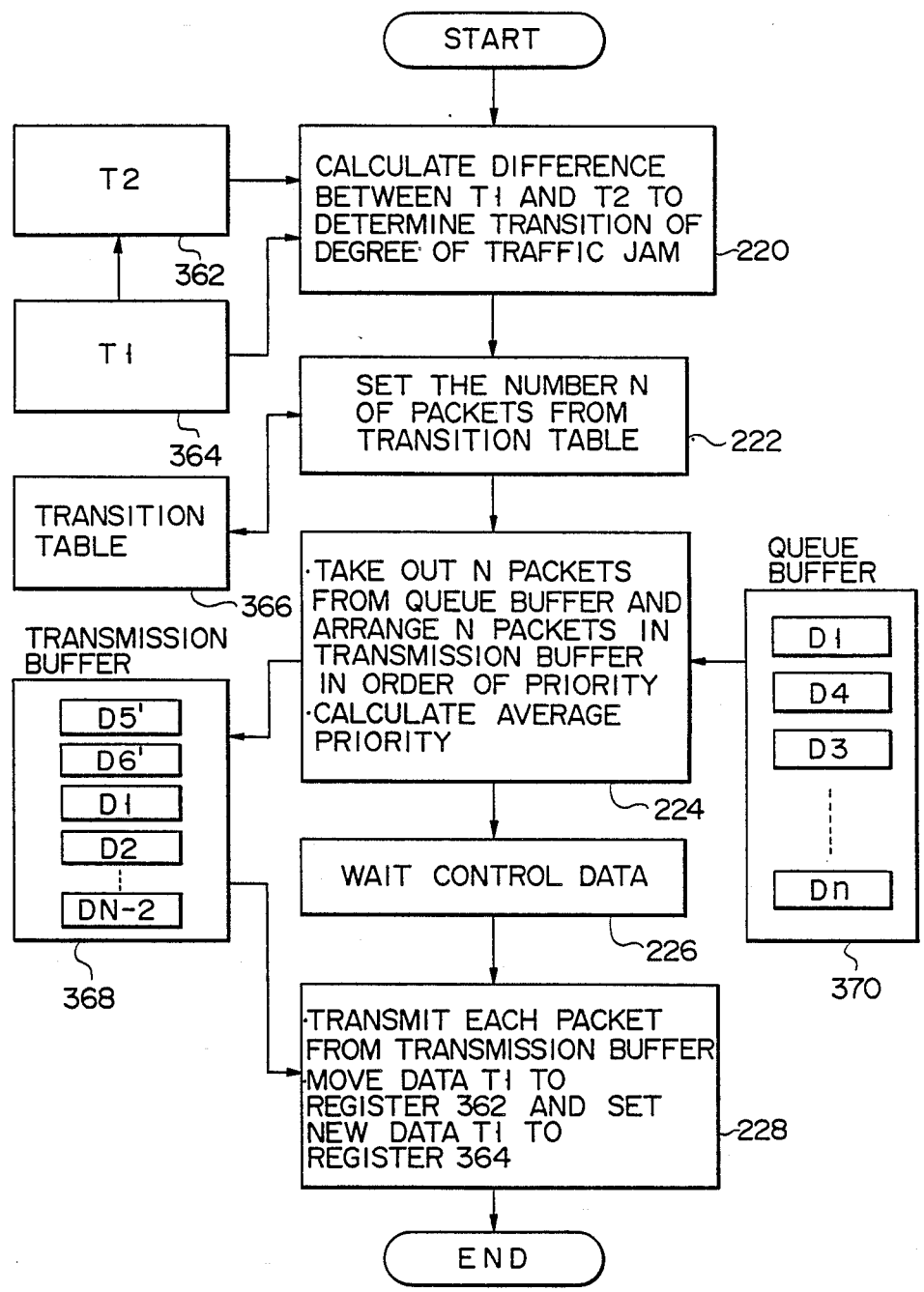
FIG. 10 is a flow chart for explaining the processing performed in order for a packet to be transmitted to the next station.

Transition table 366 is shown in FIG. 11. In table 366, data T1 corresponds to the degree of channel traffic jam, data (T2−T1) to its transition, data M to the number of packets stored in buffer 370-2, i.e., the content of counter 374-2, and $\Delta I1$ and $\Delta I2$ to its transition or the content of counter 376-2. For example, in case of the same packet number M1, even if time difference (T2−T1) is large, if time data T1 is large, number N of packets is small. Even if time difference (T2−T1) is small, if time data T1 is also small, then number N of packets may be large. Even if data T1 and data (T2-T1) is the same, number N of packets to be transmitted can be large if an increase ($\Delta I2$) in number M of packets in queue buffer 370 is large. To the contrary, if the number M of packets in queue buffer 370 is decreased ($\Delta I1$), number N of packets to be transmitted becomes small accordingly. The number of packets which is predetermined as described above, are stored in table 366 of this embodiment.

When number N is determined in step 222, number N' of packets left in transmission buffer 368-2 is checked in step 224. In this example, packets D5' and D'6 are left in buffer 368-2. (N−N') packets of all packets stored in queue buffer 370-2 i.e., packets D1, D4, D3 , . . . are taken out from the beginning. The taken-out packets are rearranged in a priority order and are stored in transmission buffer 368-2. In this case, no rearrangement is performed for the remaining packets, i.e., packets D5' and D6' already stored in transmission buffer 368-2. Thereafter, the average priority of packets left in queue buffer 370-2 is calculated, and a calculated value is stored in register 372-2.

Detection of transmission enable data by detector 324 is waited in step 226. When the transmission enable data is detected, an operation in step 228 is performed. The packets in transmission buffer 368-2 are sequentially read out in an order and the readout packets are transmitted to packet generator 328-2. The intrastation and destination station addresses are supplied from address generator 330-2 to generator 328-2. In generator 328-2, these addresses are added to the packet, and necessary control processing is performed. The packet is then sent to transmitter 332-2. Thereafter, the transmission packets are multiplexed by multiplexer 26. The multiplexed data is transmitted onto transmission line 10 through transmitter 28.

Thereafter, data T1 is moved to register 362-2 as data T2. The current cyclic time is stored in register 364-2 as data T1. The transmission enable data is transmitted to the next station through transmitter 332-i, multiplexer 26, transmitter 28.

A reception operation will be described below.

When transmission data is received by receiver 22 in transceiver controller 20, the transmission data is supplied to band detector 24. Detector 24 detects a band of the transmission data and transmits it to packet controller 30-i in accordance with the detected band.

In controller 30-i, the packet is supplied to detector 324-i through receiver 322-i. Detector 324-i detects whether the destination station address is the same as the intrastation address assigned to the corresponding packet controller. If so, the packet is stored in a reception buffer (not shown). Thereafter, the destination terminal address written in the destination address field of the packet is checked, and the packet is transmitted to the corresponding terminal through the corresponding adapter.

If the transmission enable data is detected, the above transmission operation is performed.

However, if the transmission data in a given station is neither the packet supposed to be sent to the intrastation nor the transmission enable data, the transmission data is transmitted to the retransmission section.

In the above embodiment, a band multiplexing scheme may be a time-divisional, frequency-dividing, or spatial dividing multiplexing scheme. A bus between the terminal and the adapter may be replaced with a gate way (bridge) and branch line LAN. In this case, terminal packets instead of the transfer data are transmitted from the terminal to the adapter and a packet may be reconstituted from these terminal packets.

In the above embodiment, a packet controller for transfer data from a terminal is selected by using an average priority. However, the number of packets stored in each queue buffer may be simply used. In this case, a packet counter is used in place of the average priority register in the packet controller. Instead of calculating the average priority in steps 210 and 224, a content of the packet counter is searched in steps 210 and 224. In steps 202 to 206 in FIG. 8, the packet controller having a queue buffer which stores the smallest number of packets is selected. According to this scheme, the arrangement can be simplified.

In the above embodiment, each packet controller has an average priority register and each adapter has an average priority search table. However, a given packet controller may have an average priority table. In this case, the average priority register in each packet controller and the search table in each adapter are not necessary. The average priority calculated by each packet controller is written in the average priority table in the given packet controller. The average priority is output from the table each time the table is referred to by an adapter. An output order of the average priorities is similar to that in the above-mentioned embodiment.

What is claimed is:

1. A data transmission system which effectively utilizes channels of a multiplexed transmission line, comprising:
   a plurality of packet control means, each provided for a channel each for receiving packets to store the received packets, each packet having a priority, for calculating an average priority of the stored packets and for transmitting the stored packets through a corresponding channel; and
   adapter means for selecting as a destination packet control means one of said plurality of packet control means, in accordance with a priority of an object packet to be transmitted and the average priorities calculated by said plurality of packet control means, and for transmitting the object packet to said destination packet control means.

2. A system according to claim 1, wherein said adapter means includes means for selecting as said destination packet control means one of said plurality of packet control means which has a lower average priority than the priority of the object packet.

3. A system according to claim 1, wherein said adapter means includes means for selecting as said destination packet control means one of said plurality of packet control means which has a lowest average priority.

4. A system according to claim 1, wherein each of said plurality of packet control means comprises:
   calculating means for calculating the average priority of the stored packets; and
   holding means for holding the average priority calculated by said calculating means, an inherent address being assigned to said holding means, and
   said adapter means further comprises:
   average priority search table means for storing the inherent addresses assigned to said respective holding means; and
   determining means for sequentially reading out the inherent addresses stored in said search table means, for reading out the average priority from said holding means to which the readout address is assigned, and for determining said destination packet control means in accordance with the priority of the object packet with the readout average priority.

5. A system according to claim 4, wherein said determining means includes means for holding the readout inherent address when said destination packet control means is determined and for sequentially reading out the stored inherent addresses from a next inherent address to the held inherent address.

6. A system according to claim 4, wherein said determining means includes means for holding a predetermined inherent address when said destination packet control means is determined, and for sequentially reading out the stored inherent addresses from the held inherent address.

7. A system according to claim 1, wherein each of said plurality of packet control means comprises calculating means for calculating the average priority of the stored packets,
said system further comprises average priority search table means for storing the average priorities calculated by said respective calculating means, and for sequentially outputting the average priorities each time said search table means is referred to, and
said adapter means further comprises searching means for referring to said search table means to receive the output average priority, and for said destination packet control means in accordance with the priority of the object packet with the received average priority.

8. A system according to claim 7, wherein said search table means includes means for holding the average priority when said destination packet control means is determined, and for sequentially outputting the average priorities from the average priority next to the held average priority when said search table means in referred to.

9. A system according to claim 7, wherein said search table means includes means for holding a specific average priority corresponding to a predetermined one of said plurality of packet control means when said destination packet control means is searched, and for sequentially outputting the average priorities from the held average priority when said search table means is referred to.

10. A data transmission network system including a plurality of stations connected to a loop transmission line in which channels are multiplexed, comprising:
detecting means provided for a given channel of the channels in a given station of the plurality of stations, for detecting a local traffic jam as a traffic jam in said given station;
queue buffer means provided for said given channel in said given station, for storing packets to be transmitted, each packet having a priority;
table means provided for said given channel in said given station, for storing the number of transmittable packets; and
transmission control means provided for said given channel in said given station, for referring to said table means to determine the number of packets to be transmitted, in accordance with the detected local traffic jam, for reading out the determined number of packets from said queue buffer means, and for transmitting the readout packets in order of priorities.

11. A system according to claim 10, wherein said detecting means includes;
time detecting means for detecting a queuing time on said given channel of the loop transmission line in accordance with a cyclic time of transmission enable data on said given channel; means for detecting the number of packets stored in said queue buffer means;
time transition detecting means for detecting a transition of the queuing time from the cyclic time in the immediately preceding cycle and in the second previous cycle;
means for detecting the transition of the number of packets stored in said queue buffer means; and
means for detecting the local traffic jam from at least one of the length of the queuing time, the amount of change in the queuing time, the number of the packets, and the rate at which the number of the packets changes.

12. A system according to claim 11, wherein said time detecting means includes timer means for measuring as the queuing time the cyclic time of the transmission enable data, and said time transition detecting means includes means for holding as a second time the queuing time in the second previous cycle, for holding as a first time the queuing time in the immediately preceding cycle, and for detecting the transition of the queuing time in accordance with a difference between the first and second times.

13. A system according to claim 10, wherein said transmission control means comprises means for reading out (N-N') packets from said queue buffer means when the number N' of packets to be transmitted is determined and N' packets are left in said transmission buffer means.

14. A system according to claim 10, wherein said transmission control means includes:
transmission buffer means for storing the packets to be transmitted; and
means for reading out the packets from said queue buffer means, for storing the readout packets in said transmission buffer means in an order of priorities, and for transmitting the packets from said transmission buffer means in the order of priorities.

15. A data transmission system including a plurality of stations connected to a multiplexed transmission line in which channels are multiplexed, comprising:
a plurality of packet control means, each provided a channel of the transmission line, each for receiving packets to store the received packets, for transmitting the stored packets through said arranged channel in accordance with a received transmission enable signal; and
adapter means for formatting the packet from input data, and for transmitting the formatted packet to one of said plurality of packet control means which stores a smallest number of packets.

16. A system according to claim 15, wherein the multiplexed transmission line is one of a time-divisionally multiplexed transmission line, a frequency-divisionally multiplexed transmission line, and a spatial divisionally multiplexed transmission line.

17. A data transmission method which effectively utilizes channels of a multiplexed transmission line, comprising;
calculating in each of a plurality of packet controllers, and average priority from already received packets;
said plurality of packet controllers being provided for channels and each packet having a priority;
selecting, in an adapter, one of a plurality of packet controllers in accordance with a priority of an object packet to be transmitted and the calculated average priorities of said packet controllers;
transmitting the object packet from said adapter to said selected packet controller, and storing the object packet in said queue buffer of said selected packet controller; and transmitting the stored packets from said selected packet controller through a corresponding channel in accordance with a traffic jam in said selected packet controller.

18. A method according to claim 17, wherein said adapter selects as the destination packet controller one of said plurality of packet controllers which has a lower average priority than the object packet priority.

19. A method according to claim 17, wherein said adapter selects as the destination packet controller one of said plurality of packet controllers which has a lowest average priority than the object packet priority.

20. A method according to claim 17, wherein the transmission line is of a loop type, and said destination packet controller detects the local traffic jam from a cycle time of transmission enable data on the transmission line and the number of the stored packets in said queue buffer.

* * * * *